United States Patent
Yamamoto et al.

(10) Patent No.: US 8,811,286 B2
(45) Date of Patent: Aug. 19, 2014

(54) BASE STATION, INTERFERENCE CONTROL METHOD AND RADIO COMMUNICATION SYSTEM

(75) Inventors: Tomonori Yamamoto, Fujisawa (JP); Rintaro Katayama, Fujisawa (JP); Keisuke Takeuchi, Yokohama (JP)

(73) Assignee: Hitachi Ltd., Tokyo (JP)

( * ) Notice: Subject to any disclaimer, the term of this patent is extended or adjusted under 35 U.S.C. 154(b) by 119 days.

(21) Appl. No.: 13/462,273

(22) Filed: May 2, 2012

(65) Prior Publication Data

US 2012/0281569 A1    Nov. 8, 2012

(30) Foreign Application Priority Data

May 6, 2011    (JP) .................................. 2011-103468

(51) Int. Cl.
   *H04W 4/00*        (2009.01)
(52) U.S. Cl.
   USPC ......................................................... 370/328
(58) Field of Classification Search
   USPC .................................. 370/328–339, 345, 347
   See application file for complete search history.

(56) References Cited

U.S. PATENT DOCUMENTS

| | | | |
|---|---|---|---|
| 5,483,537 A | 1/1996 | Dupuy | |
| 6,747,967 B2 * | 6/2004 | Marinier | 370/337 |
| 6,885,646 B2 * | 4/2005 | Zhang | 370/330 |
| 2004/0190474 A1 | 9/2004 | Zhang | |
| 2009/0052353 A1 * | 2/2009 | D'Amico et al. | 370/280 |

FOREIGN PATENT DOCUMENTS

JP    08-065738 A    8/1996
WO    03/096710 A2    11/2003

OTHER PUBLICATIONS

Sourour E: "Time Slot Assignment Techniques for TDMA Digital Cellular Systems", IEEE Transactions on Vehicular Technology, IEEE Service Center, Piscataway, NJ, US, vol. 43, No. 1, Jan. 1, 1994, pp. 121-127.

* cited by examiner

*Primary Examiner* — Frank Duong
(74) *Attorney, Agent, or Firm* — Mattingly & Malur, PC

(57) ABSTRACT

Timing division multiplexing is conducted between the cells to avoid intercell interference. Transmission timing in a time slot pattern has a given interval. A base station determines the transmission timing based on measured uplink interference power. For example, an uplink time slot pattern in which the measured uplink interference power is smaller is selected. A downlink time slot pattern is assigned so that a response to HARQ is returned at that timing. If traffic is busy, additional time slot pattern may be assigned. In determination of the traffic volume, for example, the queued buffer size, the number of connected terminals, or the number of connections to a higher-level device can be used. Assignment timing can be an initial setup time, or a fluctuation detection time of a channel which can be realized by collection of report information on a downlink communication quality, periodic monitor of uplink interference information.

19 Claims, 15 Drawing Sheets

BASE STATION, INTERFERENCE CONTROL METHOD AND RADIO COMMUNICATION SYSTEM

CLAIM OF PRIORITY

The present application claims priority from Japanese patent application JP 2011-103468 filed on May 6, 2011, the contents of which are hereby incorporated by reference into this application.

BACKGROUND OF THE INVENTION

1. Technical Field

The present invention relates to a base station, an interference control method, and a radio communication system, and more particularly to a base station, an interference control method, and a radio communication system, which conduct an interference control in locating plural micro base stations in an autonomous interference distribution control of a cellular radio communication system, particularly, a cellular radio communication system employing an orthogonal frequency division multiple access (OFDMA) system.

2. Background Art

In recent years, frequency division duplex (FDD) cellular radio communication systems employing the OFDMA system have been actively developed. In Japan, the cellular radio communication system employing the OFDMA is called "the 3.9 generation radio communication system". As typical standards, there are a long term evolution (LTE) and an ultra mobile broadband (UMB), and those standards LTE and UMB have been globally standardized by industry associations such as $3^{rd}$ generation partnership project (3GPP) and 3GPP2, respectively.

In the radio communication system, a terminal accesses to a radio network configured by a base station and a core network. An area covered by the base station is called "cell", and may be called "macro cell", "pico cell", or "femto cell" according to a size of a cell radius thereof. As a basic communication means, the terminal that belongs to the base station issues a request to the base station to realize a call to another terminal belonging to the same base station or another base station over the core network. Likewise, a data communication is realized by allowing the terminal to issue a request to the base station.

In the radio communication system using the OFDMA, there has been known that a communication quality is deteriorated by a radio wave interference from a neighbor cell. In particular, in a cell edge, an interference power level from the neighbor cell and a desired signal level from a subject cell compete with each other, and it becomes clear as the deterioration of a Signal to Interference and Noise power Ratio (SINR) which is one of indexes representing, for example, a channel quality. In order to improve a capacity of not only the cell edge but also an overall system, it is important to mitigate an interference between the neighbor cells. For that reason, there has been known that the application of a fractional frequency reuse (FFR) is effective, which is a technique in which a frequency band that enables a radio signal to be transmitted with a high power between the neighbor cells is divided to cover the cell edge (an end of cell) with the divided frequency band. With the application of the FFR, a cell center terminal and a cell edge terminal are distinguished from each other to adjust an assignment and electric power of a radio resource. If there is no FFR, an equal electric power is transmitted over a full band (f0) so that scheduling can be conducted between a cell center (close to base station) and the cell edge without prejudice. However, a large interference occurs between the neighbor cells in the cell edge. Under the circumstances, the frequency band (f0) is divided into respective frequency bands (f1, f2, f3), and the electric powers that can be output in the respective frequency bands are adjusted, and a combination of the frequencies (f1, f2, f3) is appropriately selected for each cell so that the interference between the neighbor cells can be suppressed.

SUMMARY OF THE INVENTION

In the micro cell base station employing the OFDMA system, the occurrence of the interference between the cells is suppressed by the aid of the FFR. However, it is difficult to apply the FFR conducted by the macro cell as it is, to a base station such as the femto cell base station or the pico cell base station, which is relatively small in the cell (relatively narrow in radio coverage) as compared with the macro cell base station. In particular, no interface for acquiring frequency assignment information on the neighbor cell, which is essential for the FFR, exists in the femto cell. Hence, it is difficult to dynamically change the assignment of the frequency to the subject cell to prevent the interference according to the frequency assignment information on the neighbor cell. Also, it is assumed that such micro base stations are located with high density as compared with the macro cell base stations, and even if the frequency assignment information can be acquired, control is very difficult. Also, since the cell radius is naturally small, it is not effective to realize the FFR that distinguishes terminals in the cell center and the cell edge from each other.

Under the circumstances, a task in prevention of the interference between the cells by a time division multiplexing technique in cooperation with the neighbor cell is studied. If the neighbor cell makes assignment with a given time slot pattern, the subject cell implements a resource assignment with prevention of that time slot pattern. For example, JP-A-8-65738 discloses a technique in which the base station detects a downlink time slot pattern from a neighbor, and changes the downlink time slot pattern. This technique has an overhead that the base station needs to have a downlink receiver circuit since the base station measures the time slot pattern of downlink. Also, since this technique targets a code division multiple access (CDMA) system, a time slot pattern of uplink is determined by the terminal.

The present invention has been made in view of the above circumstances, and therefore one object of the present invention is to provide a base station, an interference control method, and a radio communication system, which prevent an interference between cells. Another object of the present invention is to provide a technique for selecting a time slot pattern for prevention of the interference. Still another object of the present invention is to select the time slot pattern according to a rule for prevention of the interference without the base station using the downlink receiver circuit.

In the present invention, for example, a radio resource to be used is divided in time, and time division multiplexing is conducted between the base stations or the cells to prevent the interference between the cells. A time slot pattern is created so that transmission timing has a certain interval. The base station determines the transmission timing used in a subject cell on the basis of a measurement result of an uplink interference power.

The time division multiplexing is thus conducted between the base stations to prevent the interference between the cells. The base station according to the present invention determines both of uplink and downlink time slot patterns on the basis of the uplink interference power. Since the base station naturally has an uplink receiving function, there is advantageous in that a downstream receiver circuit may not be provided by using the uplink interference power as a base. Also, the OFDMA system originally has no rule for the time division multiplexing between the cells. Hence, there is a need to set a punctual rule between the cells. In the present invention, for the time division of the radio resource to be used, a round trip time (RTT) of a hybrid automatic repeat request (HARQ) is fixed to generate the time slot pattern, and the time division multiplexing between the cells is conducted.

The base station selects a radio resource small in a interference power as the uplink time slot pattern according to the measurement result of the uplink interference power. Further, the base station assigns the downlink time slot pattern so as to return a response to the HARQ at that timing. If traffic is busy, the base station additionally assigns the time slot pattern. The queued buffer size, the number of connected terminals, or the number of connections with higher-level devices may be used in the determination of a traffic volume.

The control may be triggered at the time of initialization or detecting a change in a channel and the traffic. A channel change detecting method can be realized by collection of report information on a downlink communication quality and periodic and/or aperiodic monitor of uplink interference information. A traffic change detecting method can be realized by periodically and/or aperiodically checking the number of terminals or the queued buffer size.

For example, as compared with the technique disclosed in JP-A-8-65738, the present invention has only to measure the interference power of uplink, and therefore the base station does not need to have the downstream receiver circuit. Also, the present invention is intended for a system in which the base station side has a function of determining the time slot pattern of the uplink. Also, a task that a frequency of a control channel conflicts with a cell frequency cannot be treated by the related art. With the use of the technique of the present invention, not only a data channel but also the control channel can be intended for interference control.

According to the first solving means of this invention, there is provided a base station in a radio communication system in which a plurality of base stations communicate with a terminal using one or more of a plurality of time slot patterns which have slots divided in time and transmission timing of the slots has a certain interval, the base station comprising:

an interference measurement unit that measures an uplink interference power in each time slot pattern within at least the interval;

a time slot pattern determination unit that determines a time slot pattern in which measured uplink interference power is minimum or smaller than a predetermined threshold value as an uplink time slot pattern to be used in an uplink communication, and a time slot pattern of timing shifted from determined uplink time slot pattern by a predetermined timing as a downlink time slot pattern to be used in a downlink communication; and a communication processing unit that communicates with the terminal using determined uplink and downlink time slot patterns.

According to the second solving means of this invention, there is provided an interference control method in a radio communication system in which a plurality of base stations communicate with a terminal using one or more of a plurality of time slot patterns which are divided in time, and determined so that transmission timing has a certain interval, wherein a relationship that a timing of an uplink time slot pattern from the terminal to the base station and a timing of a downlink time slot pattern from the base station to the terminal are determined to be shifted by a predetermined timing, in each of the base stations;

wherein the interference control method comprising:

measuring an uplink interference power in each time slot pattern within at least the interval;

determining a time slot pattern in which measured uplink interference power is minimum or smaller than a predetermined threshold value as an uplink time slot pattern to be used in an uplink communication, and a time slot pattern of timing shifted from determined uplink time slot pattern by a predetermined timing as a downlink time slot pattern to be used in a downlink communication; and communicating with the terminal using determined uplink and downlink time slot patterns.

According to another solving means of this invention, there is provided a radio communication system comprising base stations which communicate with a terminal using one or more of a plurality of time slot patterns which have slots divided in time and transmission timing of the slots has a certain interval, wherein a relationship that a timing of an uplink time slot pattern from the terminal to the base station and a timing of a downlink time slot pattern from the base station to the terminal are determined to be shifted by a predetermined timing, in each of the base stations;

wherein the each of the base stations includes:

an interference measurement unit that measures an uplink interference power in each time slot pattern within at least the interval;

a time slot pattern determination unit that determines a time slot pattern in which measured uplink interference power is minimum or smaller than a predetermined threshold value as an uplink time slot pattern to be used in an uplink communication, and a time slot pattern of timing shifted from determined uplink time slot pattern by a predetermined timing as a downlink time slot pattern to be used in a downlink communication; and a communication processing unit that communicates with the terminal using determined uplink and downlink time slot patterns.

According to the present invention, it is possible to provide a base station, an interference control method, and a radio communication system, which prevent an interference between cells. Further, according to the present invention, it is possible to provide a technique for selecting a time slot pattern for prevention of the interference. Still further, according to the present invention, it is possible to select the time slot pattern according to a rule for prevention of the interference without the base station using the downlink receiver circuit.

DETAILED DESCRIPTION OF THE PREFERRED EMBODIMENTS

Figure 1A:
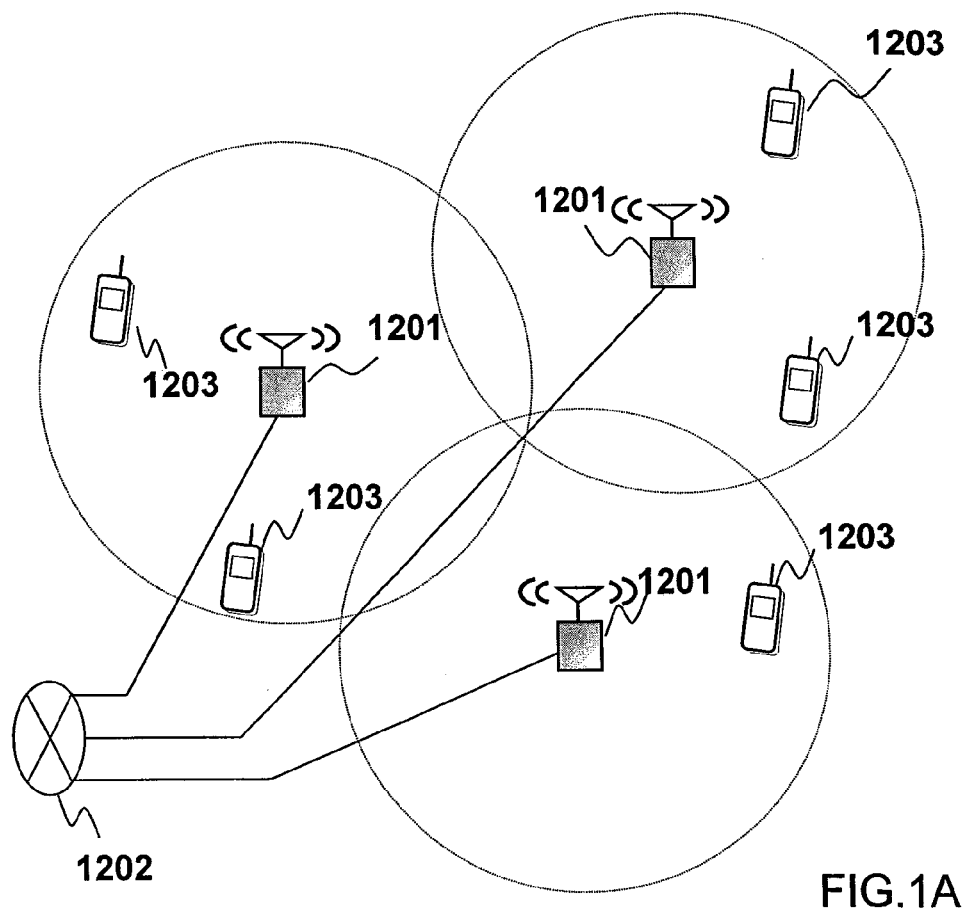
FIGS. 1A and 1B are diagrams illustrating a cellular radio communication system.

Several embodiments of the present invention will be described. Those embodiments may be implemented individually, or implemented in combination. In the following description, parts denoted by identical reference numerals in the drawings conduct the same operation, and therefore their repetitive description will be omitted.

(First Embodiment)

Figure 1B:
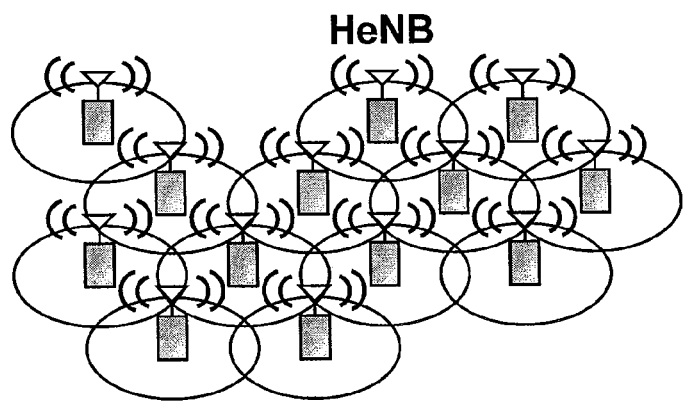

FIGS. 1A and 1B are diagrams illustrating an example of a configuration of a cellular radio communication system and a layout of base stations. The cellular radio communication system includes, for example, plural base stations 1201. The base stations 1201 communicate with terminals 1203 within their own cells wirelessly. The base stations 1201 are connected to a core network 1202 over a backhaul line.

FIG. 1B is a conceptual diagram illustrating the layout of the base stations according to this embodiment. As compared with a macro cell base station, base stations such as a femto cell and a pico cell are arranged with a high density. An area covered with those base stations may overlap with an area covered with the macro cell. This embodiment can be applied to appropriate base stations without limiting to the base stations such as the femto cell or the pico cell.

In the following description, a subject base station among the plural base stations is called "base station 1201-H", a terminal (serving terminal) that belongs to that base station and communicates therewith is called "terminal 1203-S", and a terminal (or terminal other than the serving terminal) that belongs to a base station adjacent to the base station 1201-H and communicates with the neighbor base station is called "terminal 1203-N".

Figure 2:
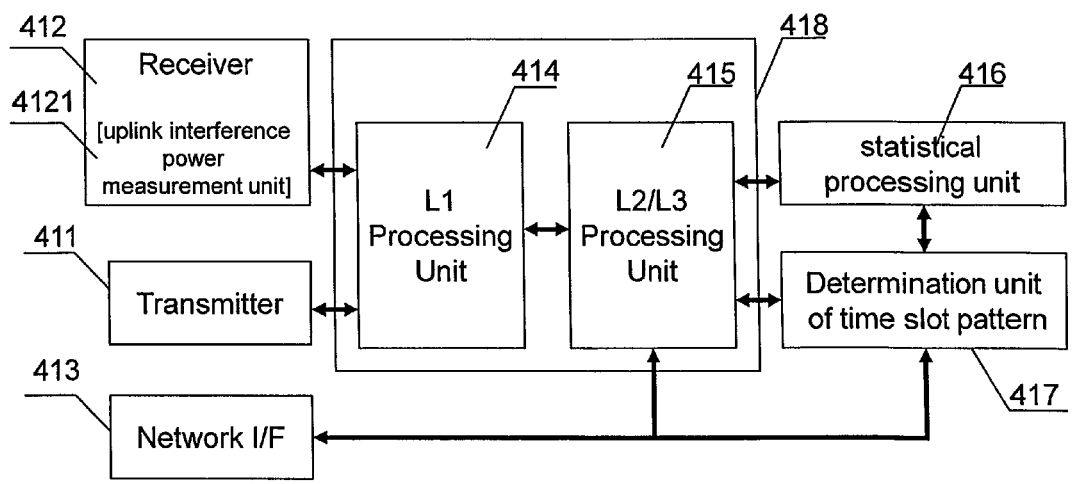
FIG. 2 is a functional block diagram illustrating a femto cell base station according to this embodiment.

FIG. 2 illustrates a functional block diagram of the base station according to this embodiment.

A transmitter 411 is a block for allowing the base station 1201-H to transmit a downlink signal to the terminal 1203. The transmitter 411 may include a process of converting the downlink signal from a baseband signal to a radio frequency (RF) signal. The transmitter 411 also includes a transmitter antenna for transmitting a radio wave.

A receiver 412 is a block for allowing the base station 1201-H to receive uplink signals from the terminal 1203-S and the terminal 1203-N. The receiver 412 may include a process of converting the uplink signal from the RF signal to the baseband signal. The receiver 412 also includes a receiver antenna for receiving the radio wave. The transmitter and receiver antennas may be commonly used. In this embodiment, because it is assumed that an uplink interference power is measured, this function has an uplink interference power measurement function unit (interference measurement unit) 4121.

A network interface (I/F) 413 is an interface for allowing the base station 1201-H to connect to the core network 1202 through the backhaul line. With connection to the core network 1202, there can be provided functions of a mobile communication such as information exchange between the base stations, a mobility management, a communication with an OAM device, and transmission or reception of data, or call desired by the terminals 1203.

A communication processing unit 418 includes a layer 1 (L1) processing unit 414, and a layer 2, 3 (L2/L3) processing unit 415, and communicates with the terminals 1203 by the aid of determined uplink and downlink time slot patterns.

The L1 processing unit 414 is a site where the base station 1201-H implements signal processing of a physical layer. Main processing contents on a transmitter side include, for example, adaptive modulation, error-correcting coding, signal processing of multiple input multiple output (MIMO) called "layer mapping" or "precoding", and fast fourier transform (FFT). Main processing contents on a receiver side include, for example, demodulation and decoding processing for solving modulation and encoding processing executed on the transmitter side. Data to be transmitted to the terminals 1203 is acquired from the L2/L3 processing unit 415, and data acquired from the terminals 1203 is transmitted to the L2/L3 processing unit 415.

The L2/L3 processing unit 415 is a block having a function of a radio resource management such as an inter-cell interference control, in addition to functions such as a management of hybrid automatic repeat request (HARQ), scheduling processing for determining an assigned resource, packet processing, keeping the radio line confidential, and the generation of signaling information to the terminal. Also, the L2/L3 processing unit 415 is a site that substantially operates a radio resource assignment with a temporal limitation to the scheduling processing which is given by a time slot pattern determination unit 417.

A statistical information acquiring unit 416 is a block that implements statistical processing in order to acquire information necessary for implementing the processing of this embodiment. More specifically, the statistical information acquiring unit 416 is a site that implements the storage of an uplink interference power measurement result for each time slot pattern in a memory (Measured Uplink IoT Table), and means the results for a given time.

The time slot pattern determination unit 417 is a site that determines an assignment of the time slot pattern which is a feature of this embodiment. The pattern of the assignment result is retained in a memory (assign slot table). The base station 1201-H matches the assignment result against the uplink interference power measurement result when implementing assignment determination processing.

Figure 3:
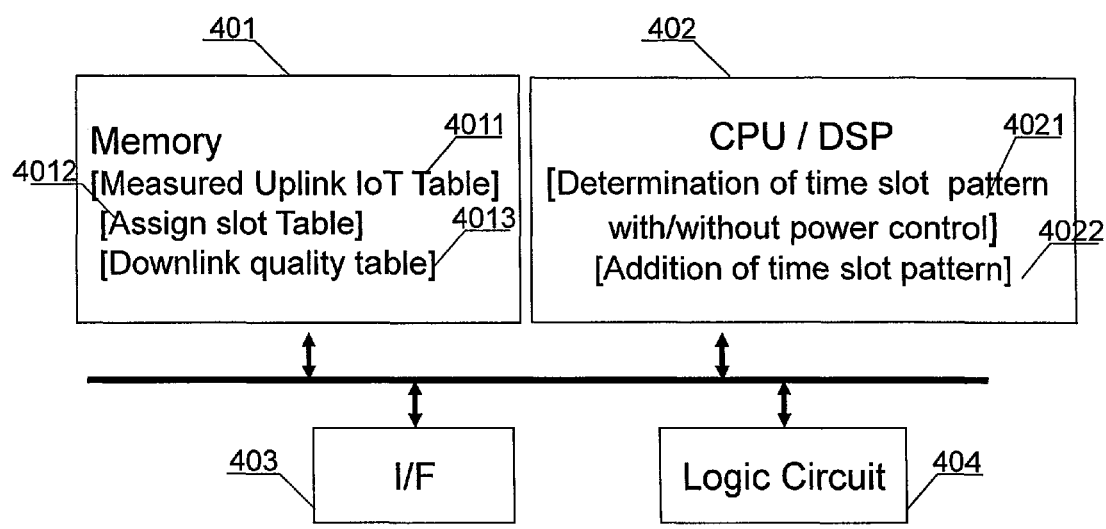
FIG. 3 is a diagram illustrating a hardware configuration of the femto cell base station according to this embodiment.

FIG. 3 illustrates a hardware configuration of the base station 1201-H according to this embodiment.

A memory 401 includes, for example, a Measured Uplink IoT Table (uplink interference table) 4011 for holding the uplink interference power measurement result used in the statistical information acquiring unit 416, an assign slot table (assign pattern table) 4012 that stores the assignment result of the time slot pattern therein, and a downlink quality table 4013 that stores downlink quality information therein.

Also, a CPU/DSP (processing unit) 402 reads and executes programs that executes a sequence of processing P1001 to P1006 according to this embodiment. For example, the CPU/DSP 402 executes determination of time slot pattern with/without power control (time slot determination processing) and addition of time slot pattern (time slot addition processing). The respective programs may be, for example, stored in the memory 401 and read by the CPU/DSP 402, or may be stored in a memory within the CPU/DSP 402.

A logic circuit 404 supports the functions of the programs that are executed by the CPU/DSP 402. For example, the L1 processing unit 414 may use an accelerator for increasing a processing speed.

Through the processing of the CPU/DSP 402 and the logic circuit 404, the respective functions illustrated in FIG. 2 are realized.

An I/F (interface) 403 is a generic name of an interface with a radio antenna and an interface with the backhaul line.

Figure 4:
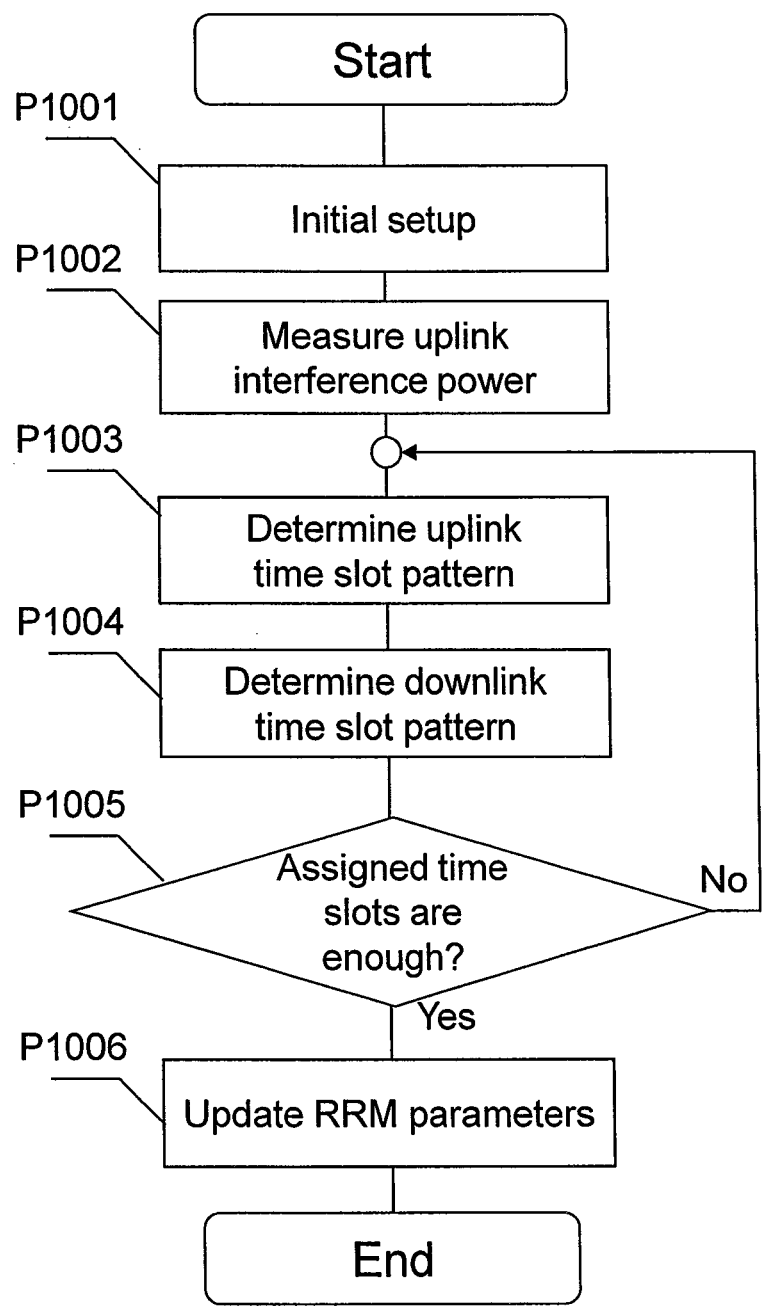
FIG. 4 is a flowchart starting from an initial state according to this embodiment.

FIG. 4 is a flowchart starting from an initial state according to this embodiment. The operation of the first embodiment will be described with reference to the flowchart of FIG. 4. The flowchart of FIG. 4 illustrates the operation conducted by the base station 1201-H (for example, the femto cell base station) after an initialization event such as power-on or reset.

In an initial setup (P1001), the base station 1201-H sets initial values of system parameters. A setting method may be read of preinstalled data, or download of a configuration parameter from a management device. The setting contents are, for example, parameters for interface of radio resource management (RRM) with an external device.

Upon completion of the initial setup, the base station 1201-H (for example, the interference measurement unit 4121) measures the uplink interference power from the terminal belonging to the neighbor base station (P1002). In this example, in order to measure the uplink interference power, the base station 1201-H stops an uplink communication of the serving terminal 1203-S that communicates with the subject base station. The base station 1201-H may preferably stop at least a radio resource (unit divided by frequency and time) to be measured, but may continue a communication in the other radio resources. In this situation, the base station 1201-H may measure the interference power for each of the time slot patterns for the use in Step P1003. The measured interference power is stored in the uplink interference table 4011 for each of the time slot patterns.

Figure 5:
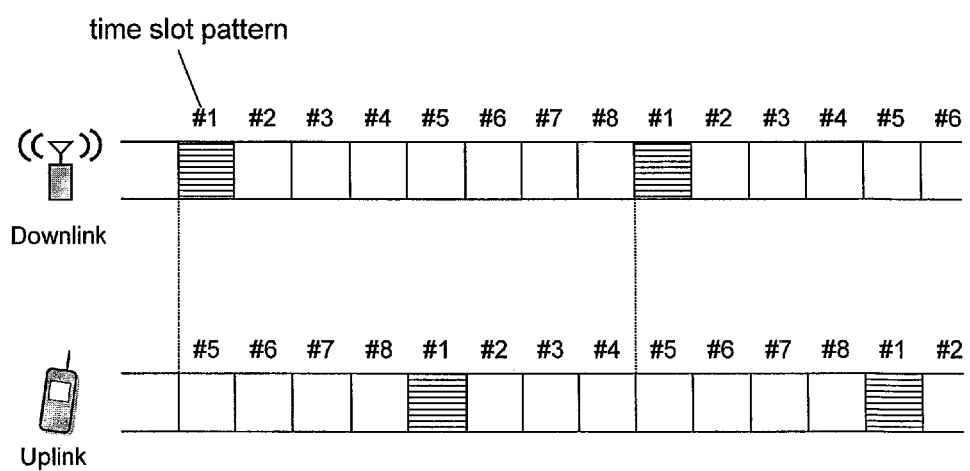
FIG. 5 is a diagram illustrating a time slot pattern.

FIG. 5 illustrates an example of the time slot pattern. Since a transmission timing with the same number is used, this is called "time slot pattern". For example, in both of the uplink from the terminal to the base station and the downlink from the base station to the terminal, at least one of plural time-divided time slot patterns is periodically used so that the plural base stations and the terminals communicate with each other. In an illustrated example, respective time slot patterns #1 to #8 are repetitively used. In measuring the interference power of the time slot patterns, a timer is provided to average the power for each of the time slot patterns. An averaging method may be a forgetting average or an arithmetic average. The averaging method, a forgetting factor, and a time of the timer may be held as the system parameters, or may be pre-installed. The time of the timer is longer than at least an interval of the time slot pattern, and in an example of FIG. 5, is so set as to measure the interference powers of the time slot patterns #1 to #8. As described above, when the averaging processing is also conducted, the timer is so set as to measure the interference power by plural times with respect to the time slot patterns that are repetitively transmitted.

Figure 6:
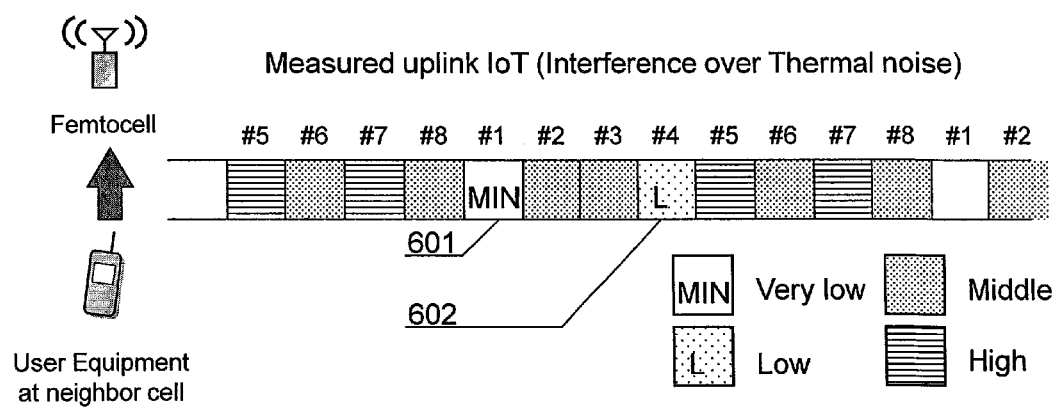
FIG. 6 is a diagram illustrating a selection of an uplink time slot pattern.
Figure 7:
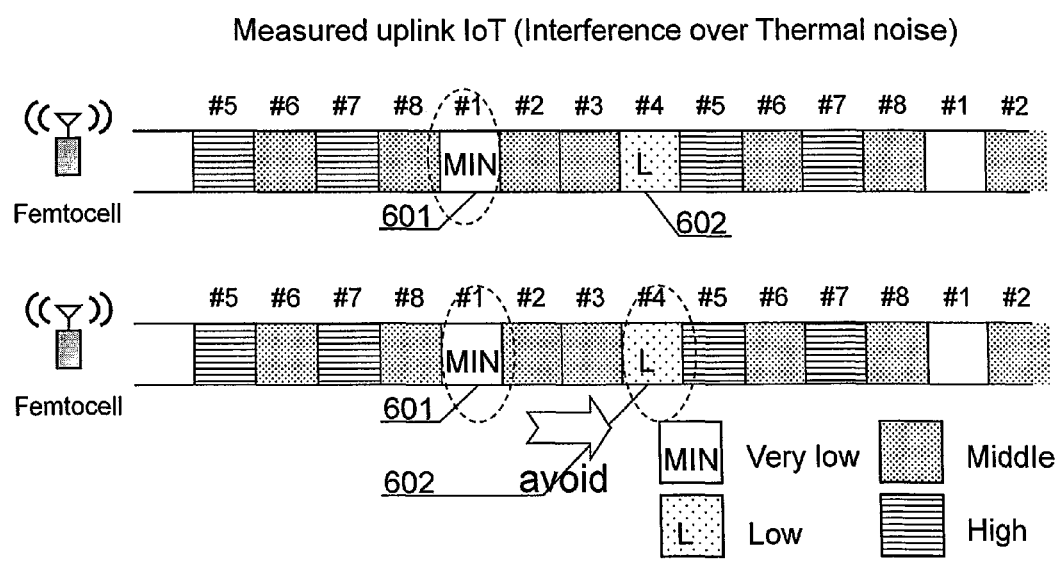
FIG. 7 is a diagram illustrating a selecting method for avoiding overlap of the time slot patterns.

Upon completion of measuring the uplink interference power, the base station 1201-H (for example, the time slot pattern determination unit 417) implements the determination of the time slot pattern used in the uplink (P1003). The base station 1201-H selects the time slot pattern smaller in the interference power from the terminal 1203-N belonging to the neighbor base station according to the result of measuring the interference as the uplink time slot pattern used by the subject cell. FIG. 6 illustrates an example of the time slot pattern and the measured uplink interference power. For example, in the case of FIG. 6, the base station 1201-H may select a time slot pattern 601 smallest in the interference power, or may select one (for example, a time slot pattern 602) of the time slot patterns in which the interference power is equal to or lower than a given level (threshold value). When the interference power is minimized, as illustrated in FIG. 7, if two base stations 1201-H start the resource assignment of the time slot pattern at the same time when the number of subject resources is only one, both of the base stations 1201-H may select the resource 601 small in the interference, and the selected resources may be identical with each other. Hence, the time slot patterns of the interference which is equal to or lower than the given level may be included as options. When the base station 1201-H operates in the initial setup, the base station 1201-H selects the time slot pattern smallest in the interference. When the base station 1201-H operates in reassignment which will be described later, the base station 1201-H may operate according to a rule of selecting the time slot pattern from the time slot patterns of the interference which is equal to or lower than the given level at random.

When an uplink transmission timing (time slot pattern used in uplink communication) is determined, the base station 1201-H intensively arranges both of a uplink control channel and a data channel at that timing. For example, in the E-UTRA, the base station 1201-H may intensively assign a Physical Uplink Control Channel (PUCCH) and a Physical Uplink Shared Channel (PUSCH).

When the uplink time slot pattern is determined, the base station 1201-H (for example, the time slot pattern determination unit 417) then determines a downlink time slot pattern (P1004). In the communication in a radio section, a transmission method retransmission control) called "HARQ" is generally used. This is a system in which when a data signal is transmitted from the transmitter side, retransmission is conducted until an ACK signal is returned from the receiver side. When failing to decode the signal, the receiver side returns an NAK signal, and when succeeding in decoding the signal, the receiver side returns the ACK signal. A time since the base station 1201-H transmits the signal until a determination signal is returned to the base station 1201-H is called "round trip time (RTT)".

Figure 8:
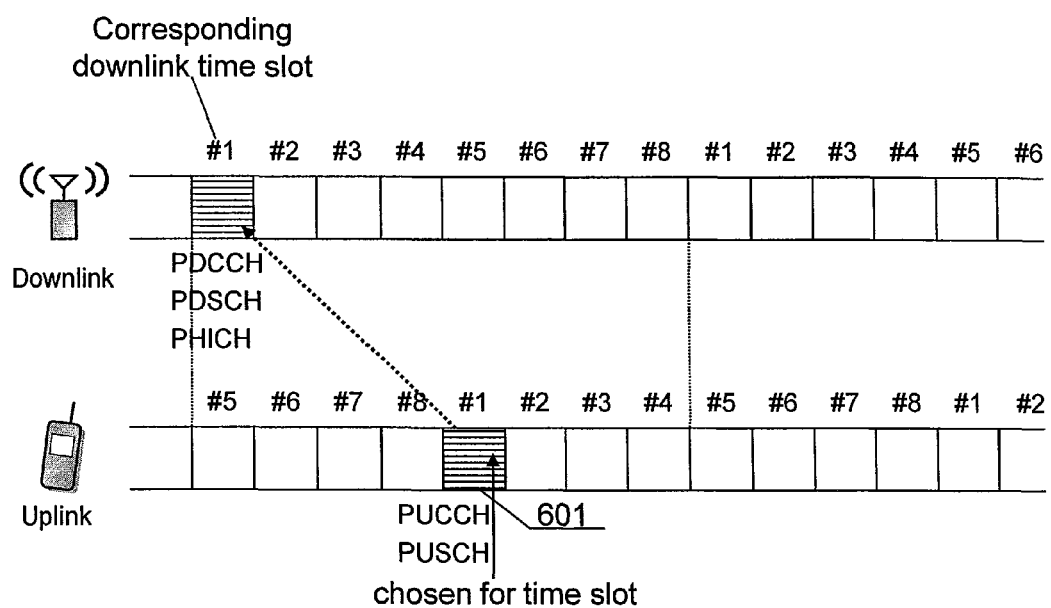
FIG. 8 is a diagram illustrating a selection of a downlink time slot pattern.

The uplink control channel including ACK/NAK determination information with respect to a downlink data transmission can be determined in association with the downlink time slot pattern when the downlink transmission is assumed. For example, it is prescribed that a response to the downlink transmission is returned 4 subframes (4 ms) after downlink transmission in E-UTRA. That is, as illustrated in FIG. 8, if the uplink transmission timing (for example, 601 in the figure) is determined, a downlink transmission timing can be also patterned by winding back four sub-frames. In this example, when the downlink data transmission timing, that is, the RTT of the HARQ is fixed, both of the uplink and downlink transmission timings can be fixed in association with each other. It is needless to say that the above-mentioned four subframes are exemplary, and a temporal determination for associating the downlink data transmission timing with the transmission timing of the uplink control channel including the ACK/NAK determination information relative to the downlink data transmission timing has only to be provided. That is, the base station 1201-H selects the downlink time slot pattern before a predetermined timing, from the transmission timings of the selected uplink time slot pattern, and sets the selected downlink time slot pattern as the downlink time slot pattern used by the subject cell.

When the downlink time slot pattern is determined, both of a downlink control channel and a data channel may be preferably intensively assigned at that timing. In a non-selected time slot pattern, a reference signal and a signal including broadcast information may be transmitted. When those signals are transmitted, a purpose of this technique can be achieved without any influence on the system. For example, in the E-UTRA, a physical downlink shared channel (PD-SCH), a physical downlink control channel (PDCCH), and a physical HARQ indicator channel (PHICH) may be intensively transmitted in only the selected time slot pattern. For example, in the non-selected time slot pattern, those channels are not assigned.

Now, the channel assignment when the processing according to this embodiment is not conducted will be described with reference to FIG. 15. A response to the downlink HARQ transmitted at a given time #1 is fed back to the base station in a Physical Uplink Control Channel (PUCCH) 701 after a given time has been elapsed. Likewise, a response to the downlink HARQ transmitted at a time #3 is fed back to the base station in a control channel 703.

On the other hand, there is no restriction that a Physical Uplink Shared Channel (PUSCH) is superimposed on the control channel 701 or 703 that returns a response to the downlink data signal. Hence, the Physical Uplink Shared Channel may be assigned to another time slot (702, 704).

Figure 15:
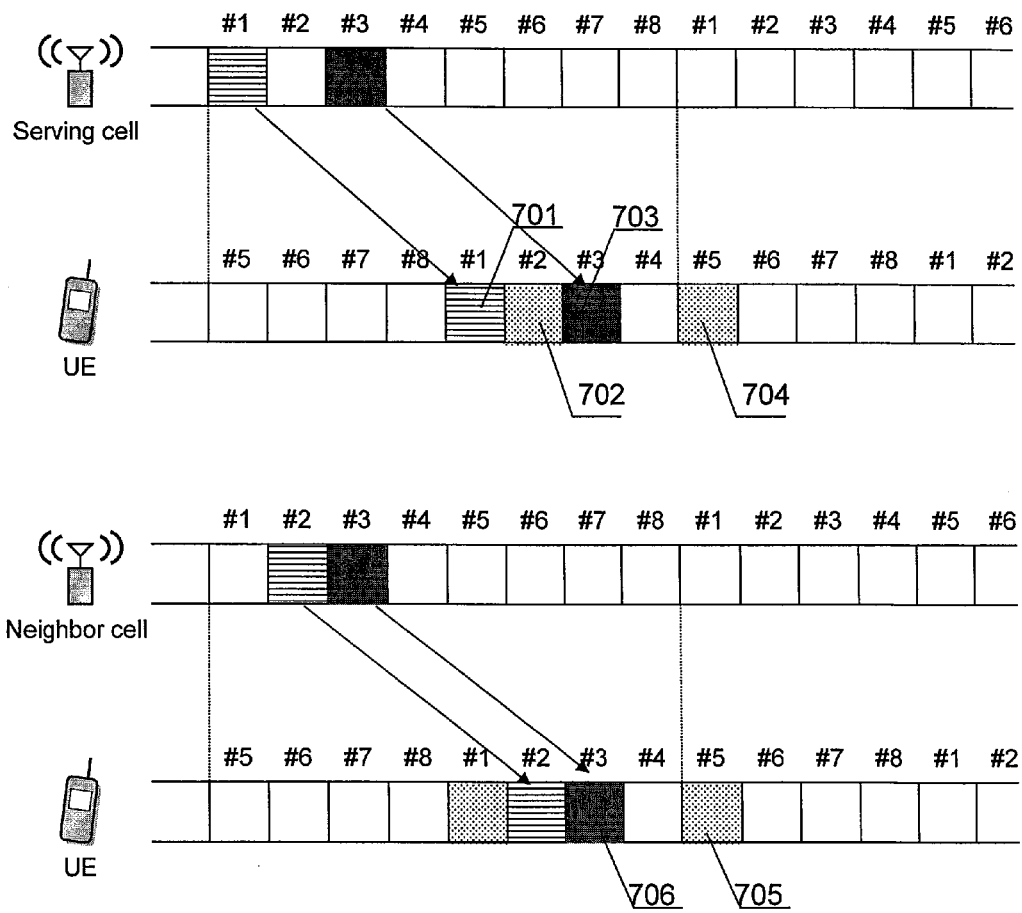
FIG. 15 is a diagram illustrating an operation executed when the time slot pattern is not conducted according to this embodiment.

Also, as illustrated in a lower stage of FIG. 15, the operation is conducted even in the neighbor base station according to the completely same rule. In this example, responses to the downlink HARQ transmitted at timings #2 and #3 are fed back to the base station. If there is no mechanism that operates in collaboration between the respective cells, there is a possibility that the data channel and the control channel collide with each other between the cells. Also, because there is no restriction that the uplink control channel and the data channel are superimposed on each other, the respective data channels such as 704 and 705 or the respective control channels such as 703 and 706 may be transmitted at the same timing.

On the other hand, if there is a mechanism that the control channel and the data channel are superimposed on each other and transmitted for each of the time slot pattern as in this embodiment, the control channel and the data channel can avoid the interference between the neighbor cells.

Returning to FIG. 4, the flowchart is continuously described. In P1003 and P1004, the uplink and downlink time slot patterns are assigned. The base station 1201-H determines whether traffic can be processed by the assigned time slot pattern, or not (P1005). As indexes of the traffic volume, the number of evolved packet service radio access bearers (E-RAB), the number of connected terminals, or a queued buffer size may be used for the determination. Those indexes are appropriately monitored by the base station 1201-H. The E-RAB indicates a connection extended between the terminal and an S-gateway (GW). The E-RAB is configured by a radio bearer between the terminal and the base station, and an S1 bearer between the base station and the S-GW. Also, the transmission standby buffer size may be a free buffer size. In the respective indexes, a mechanism is provided in which the traffic that can be processed when one time slot pattern is assigned can be set as a system parameter. The traffic volume corresponding to the number of assigned time slot patterns can be set as a threshold value. The base station 1201-H compares present values of those indexes with the threshold value, and if the present value exceeds the threshold value corresponding to the number of assigned time slot patterns, it is determined that the time slot pattern is not enough (no in P1005). If the time slot pattern is insufficient, the base station 1201-H additionally continues the assignment processing (P1003, P1004) of the time slot pattern. If the present value does not exceed the threshold value, it is determined that the time slot pattern is sufficient, and processing is shifted to the processing P1006.

If the time slot pattern is sufficiently assigned, the base station 1201-H updates parameters of an uplink scheduler and a downlink scheduler so that the data channel and the control channel are assigned in only the time slot pattern to be used (P1006). For example, the assignment time of the radio resource may be restricted. As a more specific example, the downlink HARQ of the E-UTRA does not always have periodicity, but maybe so restricted as to have a periodic motion.

Figure 9:
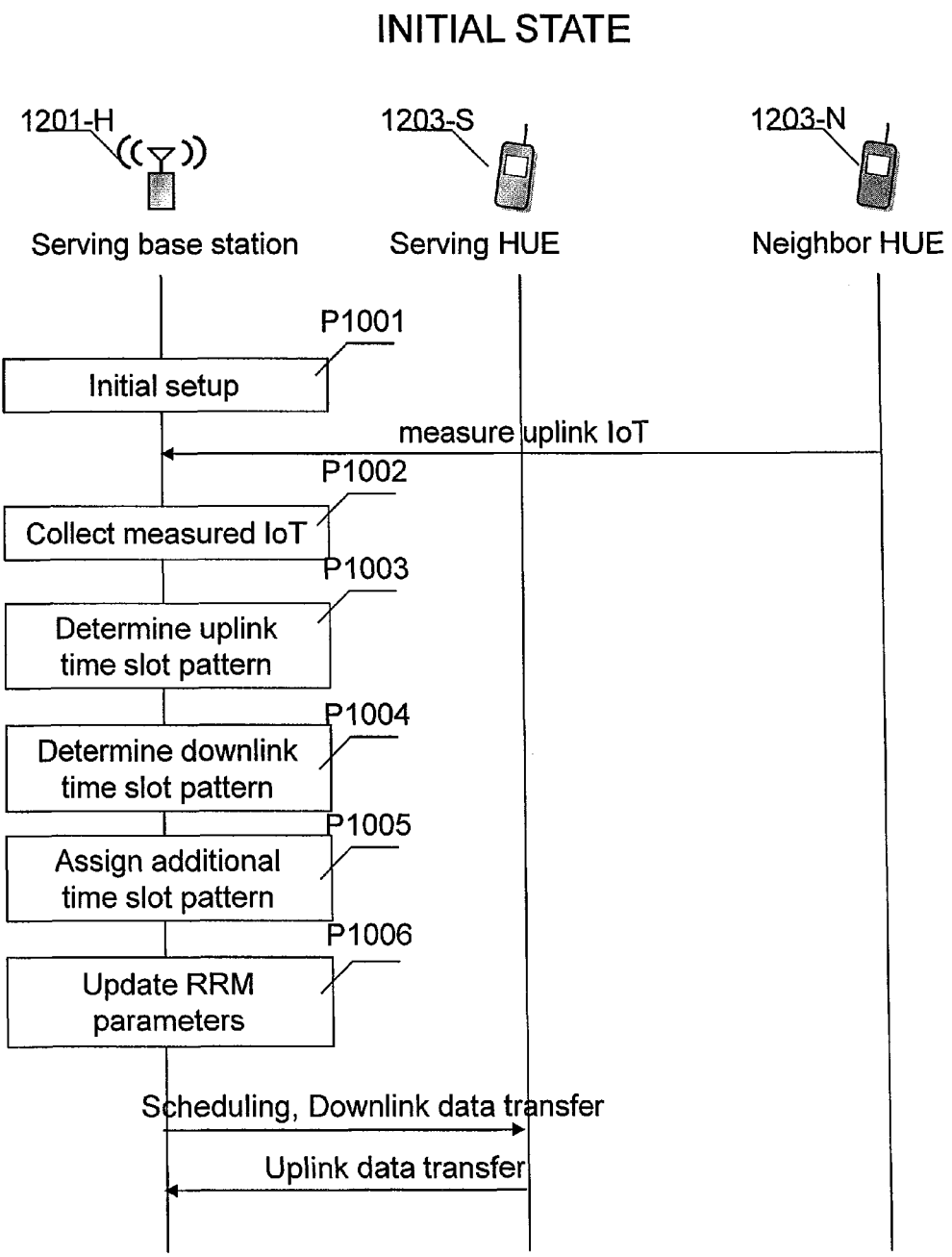
FIG. 9 is a sequence diagram illustrating an operation from the initial state according to this embodiment.

FIG. 9 is a sequence diagram illustrating a communication with another device necessary for executing the flowchart of FIG. 4. The processing P1001 to P1006 are described above. The above processing P1001 to P1006 are implemented to enable the uplink and downlink data communications with the terminal 1203-S of the subject cell.

According to this embodiment, limiting condition for the schedulers can be generated until a communication between the base station and the terminal starts after power-on or reset to construct the OFDMA system that operates in simulation in the time division multiplexing.

(Second Embodiment)

In the first embodiment, the method and the system for realizing the functions of the first embodiment from the initial state are described. In the second embodiment, a method and a system for realizing functions of this embodiment from a steady state in which a communication starts will be described. The configurations of the radio communication system and the base station are identical with those in the first embodiment.

The operation according to the second embodiment will be described with reference to a flowchart of FIG. 10. A difference from the flowchart in the initial state resides in that, for example, a function for determining whether the reassignment of the time slot pattern is necessary, or not, is added, and if it is determined that the reassignment is necessary, the time slot pattern is reassigned in the same manner as that described above.

In this embodiment, the time slot pattern is reassigned by, for example, the following triggers.

(1) The time slot pattern is assigned with a change (increase) in the uplink interference power as a trigger. In this case, the change is detected, for example, on the basis of the uplink interference power measured by the base station. Interference over Thermal noise (IoT) can be used as an quantitative index representing the interference power.

(2) The time slot pattern is assigned with a change in downlink communication quality information (deterioration of a downlink communication quality) as a trigger. Specific examples of the downlink communication quality information are stated below.

(2-1) The determination is conducted by an index of a downlink channel quality such as a CQI.

(2-2) The determination is conducted by a control result of an outer loop.

(3) The time slot pattern is assigned with a change (increase or decrease) in the traffic as a trigger. Specific examples of indexes of the traffic are stated below.

(3-1) The number of connections extended to higher-level devices is set as the index. The number of connected users may be applied.

(3-2) The number of connected terminals is set as the index.

(3-3) The buffer size is set as the index. For example, the transmission standby buffer size or the free buffer size are set as the buffer.

In addition, the fluctuation of the communication quality may be detected by an appropriate index to reassign the time slot pattern.

The base station 1201-H may have a function of detecting that there is a necessity to reassign the time slot pattern due to an increase in the interference power or the traffic while the base station 1201-H operates in the steady state. Also, the processing for reassignment may be conducted every given interval or at a specific time.

When peripheral base stations having the function of this embodiment operate at the same time, there is a possibility that the reassignment processing of the time slot pattern overlaps with each other, and the interference is continuously detected. In order to prevent this phenomenon, the base station may include a prohibit timer. For example, the prohibit timer triggers the start of the timer at the time of completing the previous assignment processing. A time until the timer expires can be predetermined as the system parameter. In an expire time (timer expire time), if the base stations of this embodiment operate with the same value, processing periods overlap with each other. Therefore, the expire time may be provided with a random offset.

The completion of the above-mentioned prohibit timer is confirmed (P1011), and if the timer expires, the base station 1201-H (for example, the statistical information acquiring unit 416) collects statistical information on an uplink received power from the terminal 1203-S which belongs to the subject cell, and a reception quality which is reported from the terminal 1203-S. The reception quality information reported by the terminal 1203-S may include a power intensity of the reference signal, downlink reception quality information, and a communication success probability (that is, HARQ, the number of ACK) of the peripheral cells including the subject cell.

For example, in the case of the E-UTRA, there may be used the indexes indicative of values reported by a measurement report such as a reference signal received power (RSRP) or a reference signal received quality (RSRQ), or information on the downlink channel quality such as a channel quality indicator (CQI), a rank indicator (RI), or a precoding matrix indicator (PMI). In the processing P1012, those indexes held in the memory by a given number of times (downlink quality table) are used for statistical processing. More specifically, the calculation of an average value, a probability distribution, or a dispersion over the given number of times for each of the indexes corresponds to the statistical processing.

In a processing P1013, the base station 1201-H detects an increase in the interference power (for example, uplink interference power), a change in the downlink communication quality information, or an increase in the traffic. The uplink interference power is measured by the interference measurement unit 4121, and for example, if the uplink interference power exceeds a threshold value, or a fluctuation range from the past measured value exceeds an allowable value, the change in the uplink interference power is detected.

As specific methods for detecting the change in the downlink communication quality information (for example, a decrease in a downlink quality or an increase in the downlink interference power), there may be used a method in which the average value or dispersion of CQI, RI, PMI, RSRP, or RSRQ, which is calculated in the processing P1012, is compared with a predetermined threshold value. Also, the change may be detected by a fact that those probability distributions are shifted backward by a given amount or more. However, since there is a possibility that the terminal reports values averaged with a portion where the time slot pattern of the subject cell is not assigned as the above values, it is expected that the precision is low. For that reason, a method of taking statistics of the ACK frequency of the HARQ may be used.

Now, the method of taking the statistics of the ACK frequency of the HARQ will be described. The base station 1201-H obtains a signal to interference and noise ratio (SINR) on the basis of the downlink communication quality (CQI) fed back from the terminal 1203-S. For example, the base station 1201-H may have a table in which the CQI and the SINR are associated with each other, and obtain the SINR corresponding to the CQI with reference to that table. The base station 1201-H selects a pattern of a code modulation system, which is called "modulation and coding scheme (MCS)" on the basis of the SINR. The base station 1201-H implements coding and modulation used for the radio section communication with the terminal 1203-S on the basis of the selected MCS. On the contrary, the terminal 1203-S feeds back the ACK if the reception is successful, and NAK if the reception is in failure. The base station 1201-H adjusts an ACK success rate, which is called "outer loop", by using the ACK/NAK fed back from the terminal 1203-S.

For example, when converting the downlink communication quality from the terminal 1203-S into the SINR, the base station 1201-H sets the SINR to be slightly higher if the ACK is returned, and to be slightly low if the NAK is returned. Those offset values are accumulated. As a result, even if a lower MCR is selected, a gradually higher MCS is selected as time elapses, and vice versa. With the use of the outer loop, it is estimated that the tendency of the MCS selected at the time of feeding back the CQI is biased to be lower than that in a normal state if the interference power increases. Hence, if an ACK occurrence frequency and control results of the outer loop are found, an increase in the interference power can be detected. For example, if a total of the offset of the above-mentioned accumulated SINR is negative, it can be detected that the downlink interference power increases. Also, for example, if the ACK occurrence frequency (for example, rate based on the number of ACK occurrences and the number of NAK occurrences) is equal to or lower than a given value, it can be detected that the downlink interference power increases.

On the other hand, a method of detecting the traffic fluctuation can be realized by periodically monitoring the number of connections extended to the higher-level device, the number of connected terminals, and the buffer size (for example, transmission standby buffer size, free buffer size), and checking whether the monitored values exceed processable numerical values (threshold values) with the present time slot pattern, or not.

In the above detection processing (P1013), if an increase in the interference power or the traffic is detected, the base station 1201-H shifts to an uplink interference power measurement processing of all the time slot patterns for assignment of the time slot patterns. The subsequent processing P1003 to P1006 are identical with the processing described in the first embodiment. The base station 1201-H starts the prohibit timer if the base station 1201-H cannot detect an increase in the interference power and the traffic in the processing P1013 (P1014). If the uplink interference power increases, the base station 1201-H releases the selected time slot pattern to execute the processing P1003 to P1006, and newly assigns the time slot pattern. On the other hand, if the traffic increases, the base station 1201-H may leave the selected time slot pattern as it is, and add the time slot pattern.

A case in which the interference power and the traffic increase is mainly described. Alternatively, when it is detected that the use rate of the time slot pattern is clearly low, likewise, in order to reduce the number of time slot patterns presently assigned, reassignment may be implemented. The detection that the use rate of the time slot pattern is low can be realized by, for example, monitoring the traffic.

Figure 10:
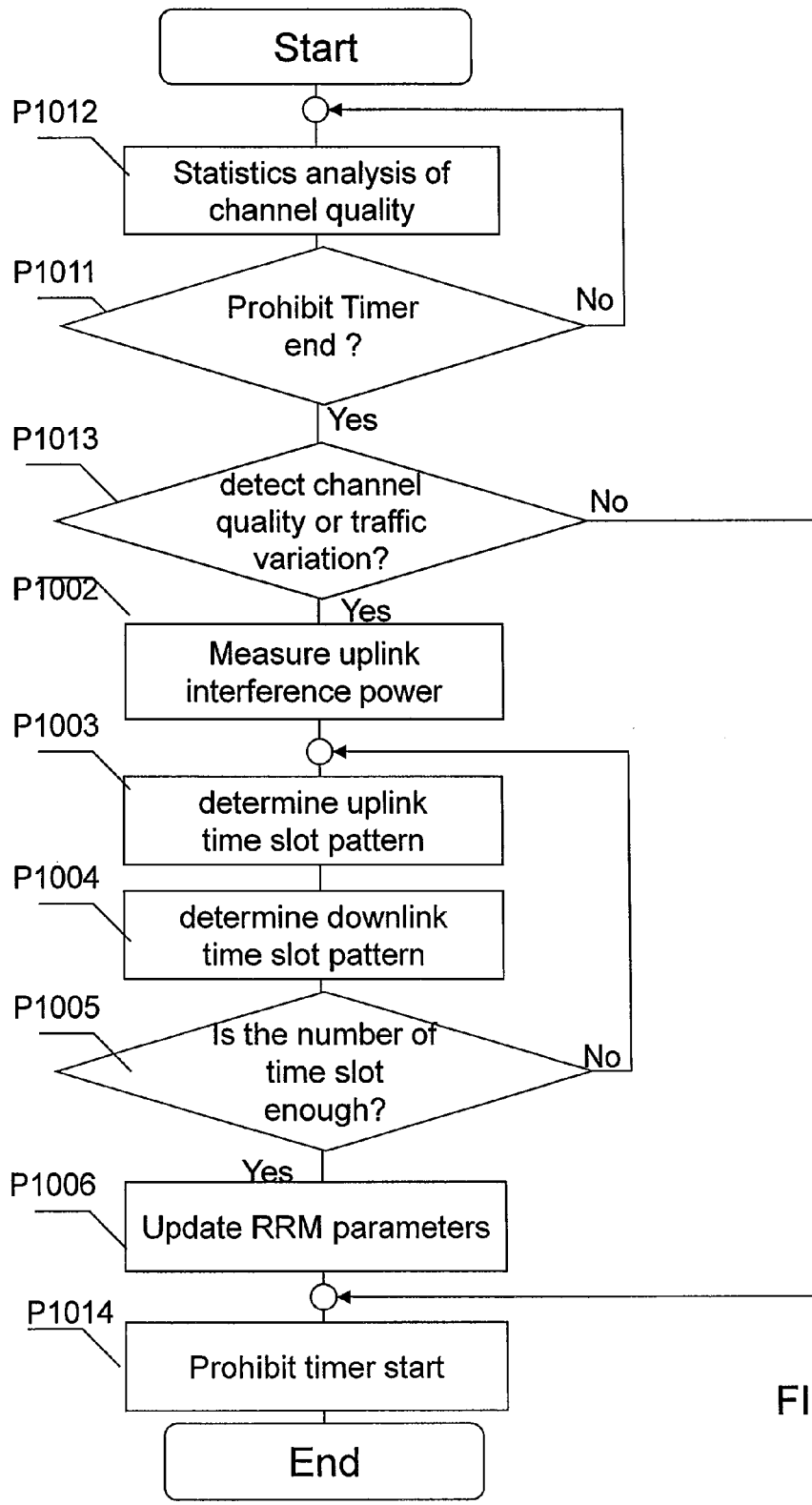
FIG. 10 is a flowchart from a steady state according to this embodiment.
Figure 11:
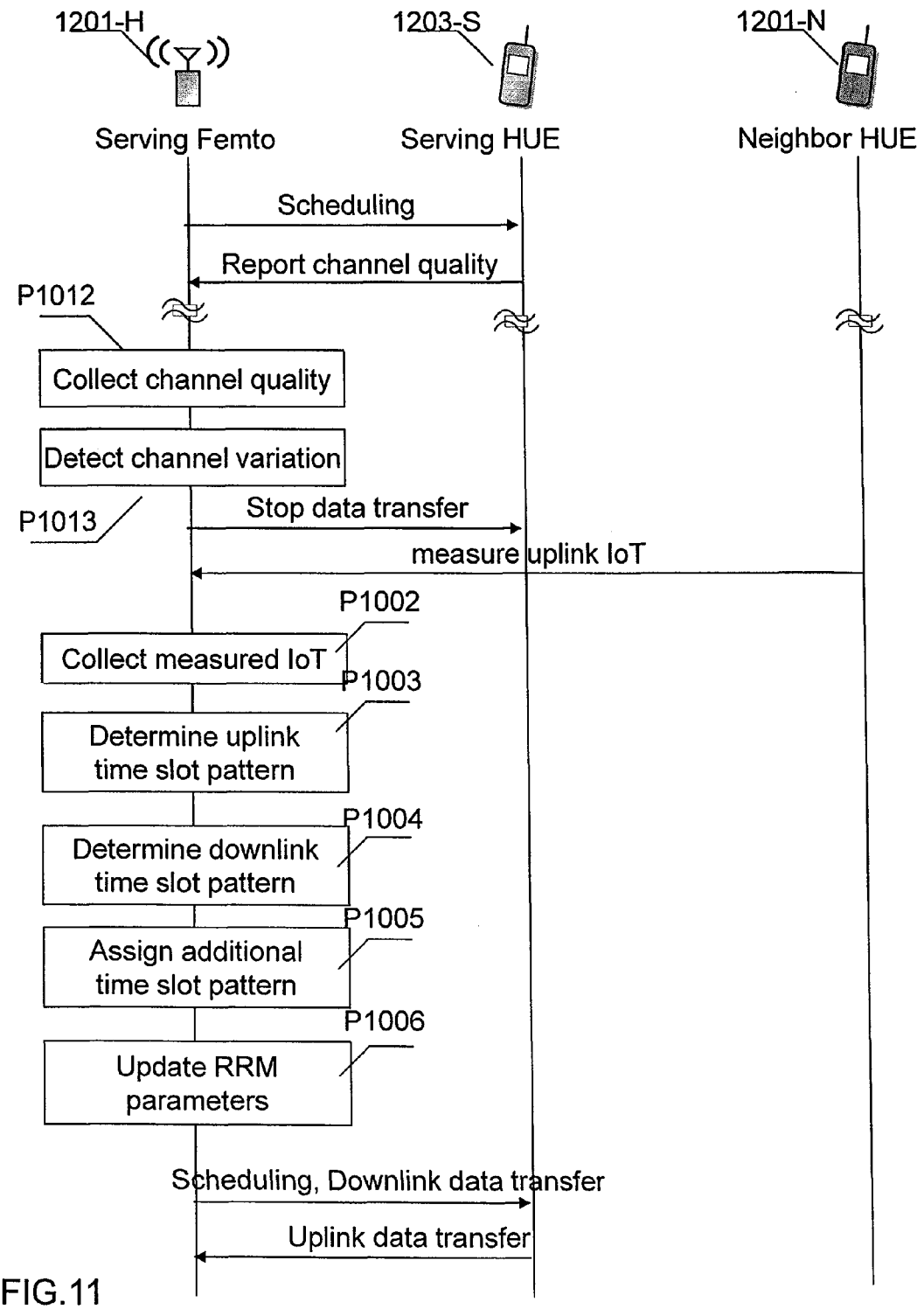
FIG. 11 is a sequence diagram illustrating an operation of triggering with an downlink communication quality from the steady state according to this embodiment.

FIG. 11 is a diagram illustrating a sequence illustrating a communication with another device required to execute the flowchart of FIG. 10. In the steady state, the scheduling and the channel quality are reported, and the detection proceeding P1012 and P1013 of the increase in the above-mentioned interference power and the traffic, and the time slot pattern assignment processing P1002 to P1006 are implemented, to thereby enable realization of the reassignment processing of the time slot pattern used in the uplink and downlink data communication with the terminal 1203-S of the subject cell.

According to this embodiment, a change from the steady state in the interference power and the traffic is detected and the reassignment of the time slot pattern is executed to enable the use of the radio resource corresponding to the traffic and the interference power.

(Third Embodiment)

In a third embodiment, a description will be given of a method in which the statistical information acquisition P1012 of the channel quality of the interference power, and the detection method P1013 of the interference power in the flowchart of FIG. 10 are different from those in the second embodiment. The configurations of the radio communication system and the base station are identical with those in the first embodiment.

Figure 12:
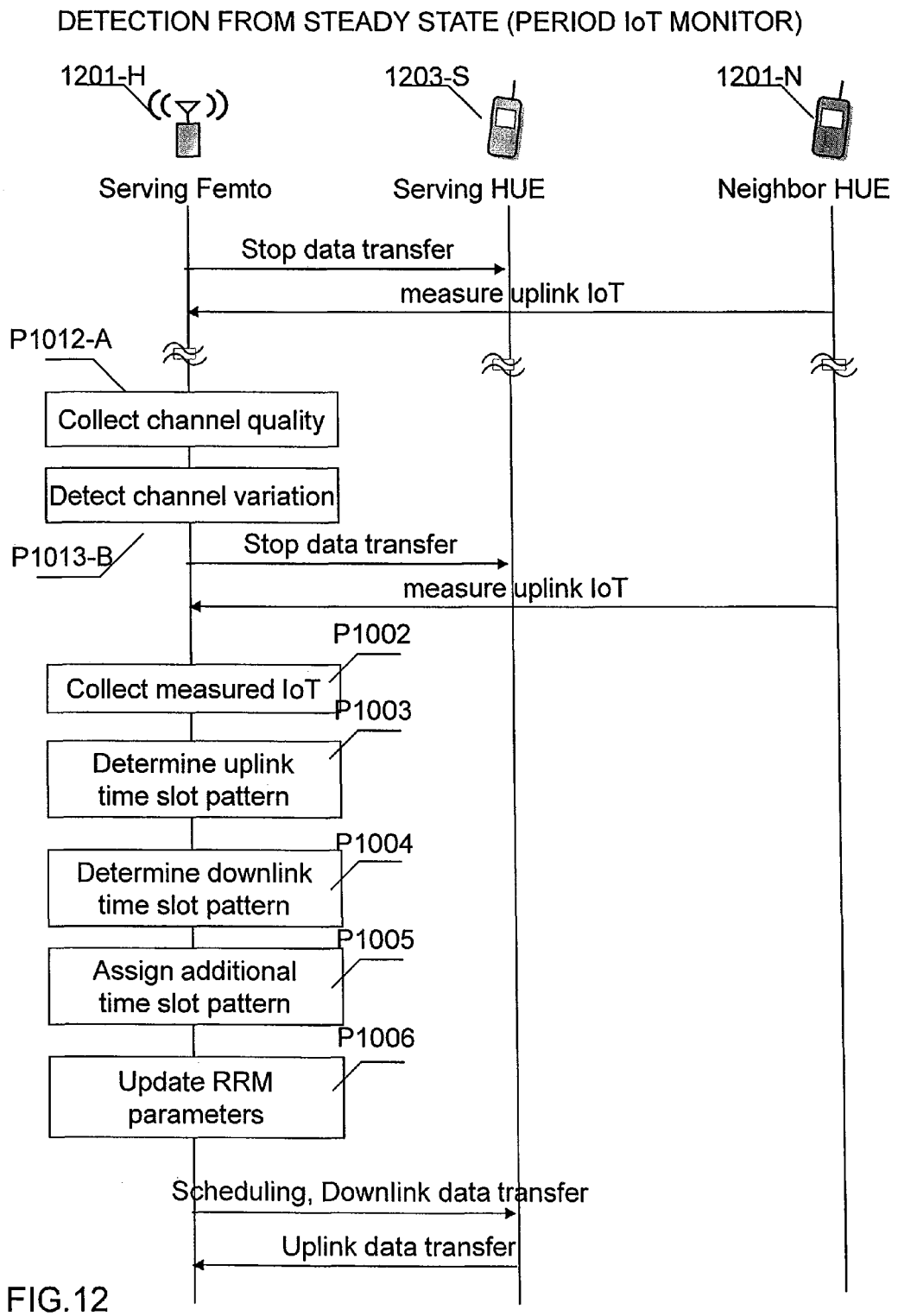
FIG. 12 is a sequence diagram illustrating the operation of triggering with an uplink communication quality from the steady state according to this embodiment.

A specific difference from the second embodiment will be described with reference to a sequence of FIG. 12. In an initial step (before statistical information acquisition) of the sequence, the base station 1201-H transmits a data communication stop command to the belonging terminal 1203-S. This is because there is a possibility that the measurement of the interference power is subject to adverse effect when the belonging terminal 1203-S continues a communication while measuring the interference power of the time slot pattern currently used.

For example, in the E-UTRA, a unit for stopping the data communication is an interface for stopping retransmission of the data channel by transmitting the ACK to a terminal intended to stop an uplink HARQ retransmission, without conducting a retransmission instruction. Also, the uplink control channel is provided with a function for allowing the terminal not to transmit the control channel in a discontinuous retransmission (DRX) section, and this function can be used. After configuration enabling the above function, the base station transmits a DRX command to the terminal, and forcedly transits the terminal to a DRX state so that the control channel transmission of the terminal can be stopped.

With the use of the above function, the base station 1201-H executes the preparation of the interference measurement, and then measures the interference power of the time slot pattern currently used by the subject cell. The interference power of the time slot pattern currently used by the subject cell, which has been acquired by the measurement, is subjected to statistical processing such as averaging and dispersion, and then saved (P1012-A). The detection in the increase of the interference power may be determined according to whether statistical values exceed a threshold value, or not (P1013-B). The subsequent processing is identical with that in the second embodiment, and the time slot pattern is reassigned.

Those processing can be executed every given time or at a specific time as in the second embodiment.

According to this embodiment, the base station 1201-H periodically monitors the uplink interference power of the time slot pattern used by the subject cell to detect an increase of the interference power, thereby enabling the reassignment to be conducted.

(Fourth Embodiment)

Figure 13:
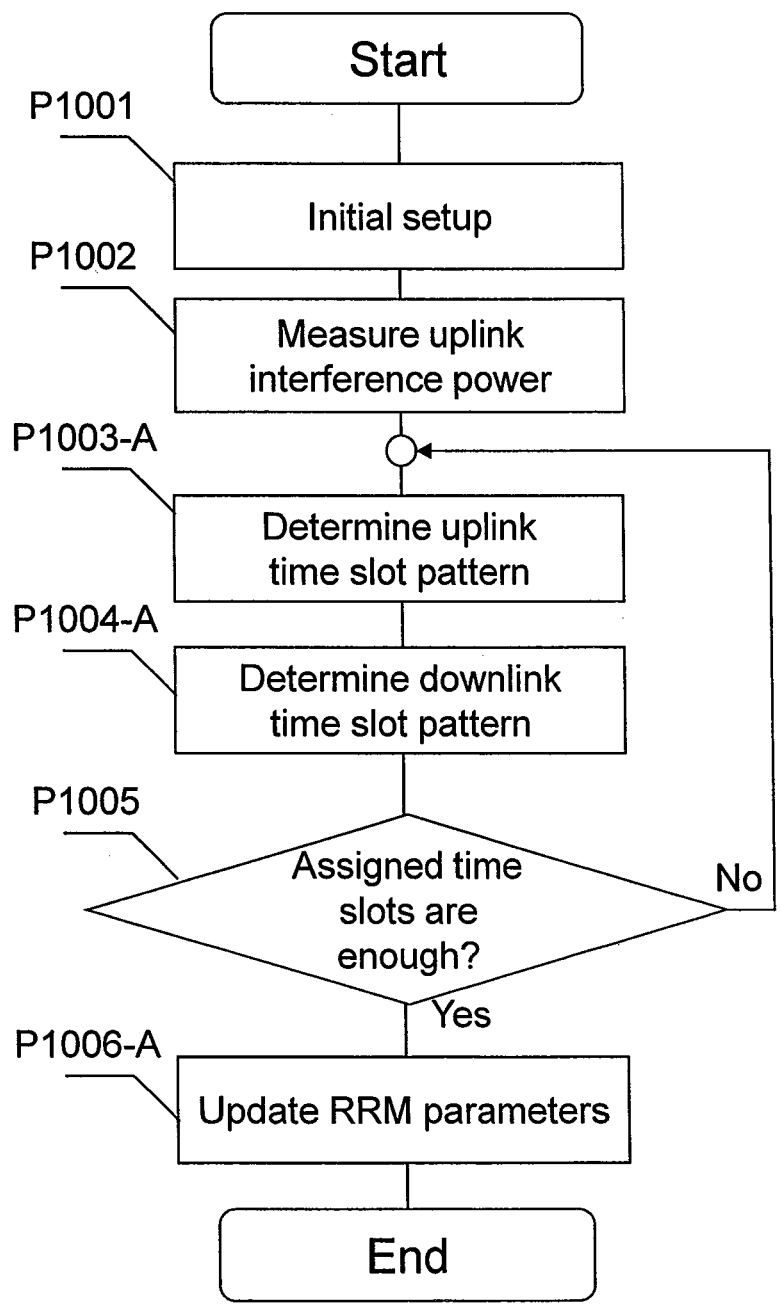
FIG. 13 is a flowchart (initial state) when a transmission power of an additional time slot pattern is suppressed.
Figure 14:
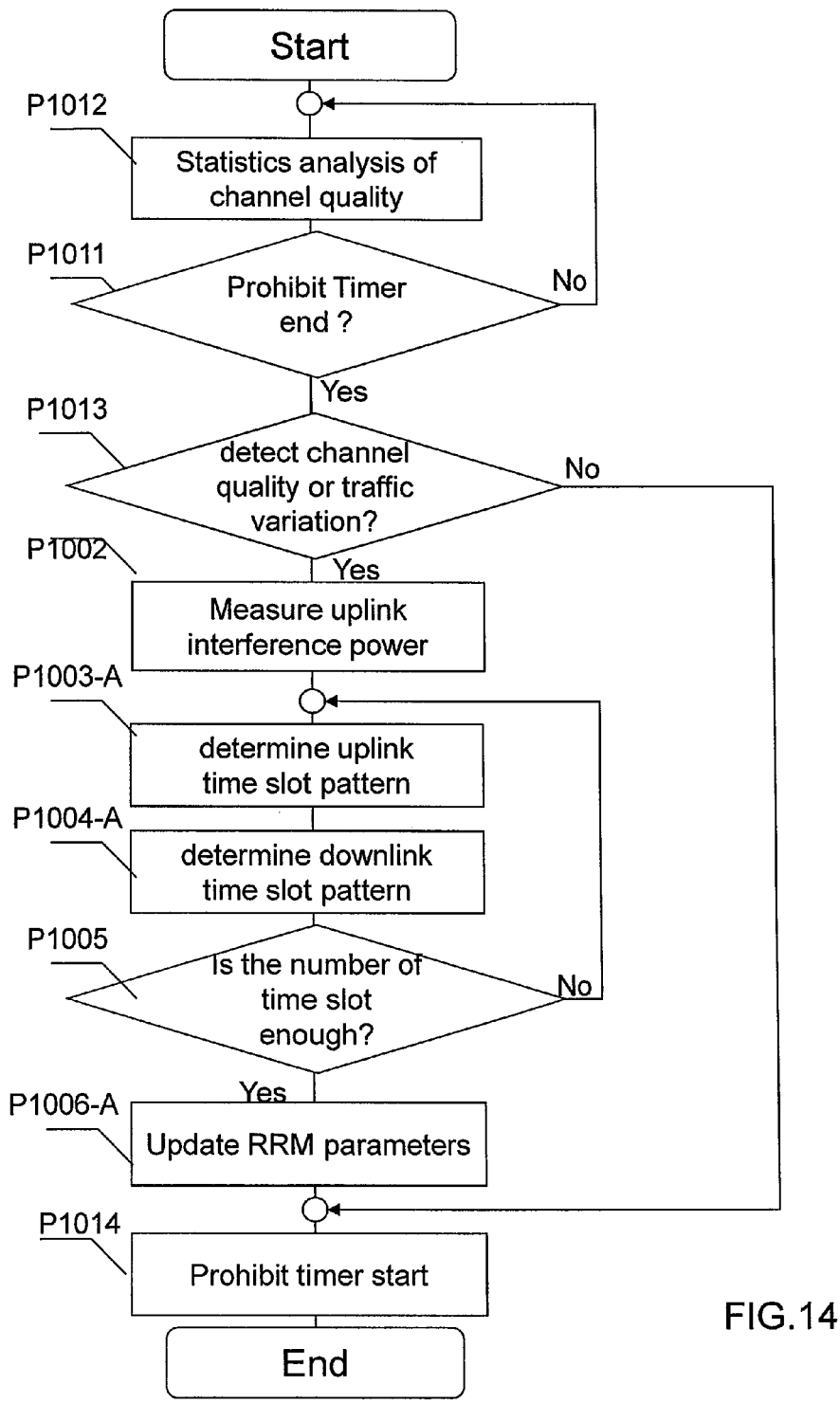
FIG. 14 is a flowchart (steady state) when the transmission power of the additional time slot pattern is suppressed.

As illustrated in FIGS. 13 and 14, when the additional time slot pattern is assigned in the flowcharts of the first to third embodiments, a power control different from that in another radio resource may be conducted on the additional radio resource (P1003-A, P1004-A). Since the resource is excessively used, it is preferable to set a lower power. For example, the transmission power from the base station is determined to a given value, and the transmission power of the additional radio resource is lower than the given value by a predetermined amount. Accordingly, the transmission power of the additional radio resource is lower than the transmission power of another time slot pattern. Accordingly, this embodiment is intended to increase the capacity of the subject cell while suppressing an influence on the neighbor cell. The configurations of the radio communication system and the base station are identical with those in the first embodiment.

Plural methods for selecting the terminal assigned to the resource having a reduced power are proposed. For example, the terminals may be assigned to the time slot pattern having the reduced power in the descending order of the downlink or uplink communication quality. This is because the terminals having a given reception quality or higher are hardly deteriorated in performance if the reception quality falls within a restriction such as an upper limit of the MCS even if the power is suppressed to some degree. The method of limiting the terminal selection adds the limiting condition related to the scheduler (P1006-A).

For example, in the E-UTRA, downlink power control realizes power control by the aid of a parameter P_A designated by a configuration of an RRC parameter set with respect to the terminal (P1003-A, P1006-A). On the other hand, in uplink power control, an offset of the power may be set by the aid of a parameter P0_PUSCH_UE (P1004-A, P1006-A). The configuration of the RRC parameter is longer in period than the processing of assigning the radio resource by the scheduler. For that reason, to use the time slot pattern high in the power and the time slot pattern low in the power (plural assigned time slot patterns) for a given terminal while being momentarily switched is difficult as it is. Although such use is not excluded, it is expected that the base station operates with the restriction that only any time slot pattern is available for the belonging terminal. When both of the time slot patterns different in the power are intended to be assigned to a certain terminal, if a pattern including no amplitude information in the modulation system, that is, QPSK is used, data can be received even if the RRC parameter is not configured. Hence, when plural time slot patterns are necessarily intended to be used for a certain terminal, such that assignment to each of the time slot patterns is biased, the MCS may be limited for conducting assignment to the time slot patterns different in the power. Alternatively, there is proposed a method in which when the assignment of the time slot patterns is conducted, the terminals are assigned to the time slot pattern having a higher power in the order from the terminal having the most accumulated transmission buffer.

According to this embodiment, one base station can obtain flexibility that one base station communicates by the aid of plural time slot patterns.

According to the respective embodiments of the present invention, the autonomous distributed interference control can be conducted while dynamically following an increasing or decreasing traffic or a status of surrounding base stations. Although the downlink interference control is also effective, because timing is fixed on the basis of the uplink transmission timing, the operation can be conducted without measuring the downlink interference power from the neighbor base station by the base station. In order that the base station measures the downlink interference power, there is a need to newly provide a downlink receiver circuit. On the other hand, in the above respective embodiments, there is no need to provide the downlink receiver circuit, and the costs are suppressed.

Also, because the control is autonomously conducted, there is no need to exchange information on synchronization or a bandwidth intended for use between the base stations. If the base stations that operate in the same rule according to the respective embodiments are adjacent to each other, there is a high possibility that the time division multiplexing is conducted as expected.

Further, since the control channel also provides the data channel and the uplink time slot pattern, not only the data channel but also the control channel can avoid the interference between the cells. Since a communication except for the selected time slot pattern is not conducted, an effect of increasing a sleep time of the terminal can be also expected.

The present invention is typically applicable to a femto cell base station as one example. The time division multiplexing system that autonomously suppresses the interference between the cells can be constructed. The present invention can mainly solve a problem on the interference when a large number of femto cell base stations are arranged indoor. It is needless to say that the advantageous effects can be obtained even for use in a base station dense area which cannot be solved by only adjustment of the frequency and the power.

What is claimed is:

1. A base station in a radio communication system in which a plurality of base stations communicate with a terminal using one or more of a plurality of time slot patterns which have slots divided in time and transmission timing of the slots has a certain interval, the base station comprising:
    an interference measurement unit that measures an uplink interference power in each time slot pattern within at least the interval;
    a time slot pattern determination unit that determines a time slot pattern in which measured uplink interference power is a minimum or smaller than a predetermined threshold value as an uplink time slot pattern to be used in an uplink communication, and a time slot pattern of timing shifted from the determined uplink time slot pattern by a predetermined timing as a downlink time slot pattern to be used in a downlink communication; and
    a communication processing unit that communicates with the terminal using determined uplink and downlink time slot patterns,
    wherein the interference measurement unit stops an uplink communication of a first terminal that communicates with the base station, and measures the uplink interference power from one or more second terminals belonging to another one of the base stations.

2. The base station according to claim 1, wherein
the time slot pattern determination unit assigns the uplink and downlink time slot patterns when detecting that the uplink interference power regularly or irregularly measured by the interference measurement unit exceeds or falls below a predetermined threshold value.

3. The base station according to claim 1, wherein
the time slot pattern determination unit assigns the uplink and downlink time slot patterns when detecting that a downlink communication quality changes by a given amount or more according to downlink communication quality information reported from the terminal.

4. The base station according to claim 3, wherein
the time slot pattern determination unit detects that the downlink communication quality changes by the given amount or more according to a statistical value of an index indicative of a downlink channel quality reported from the terminal.

5. The base station according to claim 3, wherein
the time slot pattern determination unit detects that the downlink communication quality changes by the given amount or more according to an occurrence frequency of an ACK signal from the terminal or a control result of an outer loop control based on the occurrence frequency of the ACK signal.

6. The base station according to claim 1, wherein
the time slot pattern determination unit assigns the uplink and downlink time slot patterns when detecting that an index of traffic between the base station and the terminal exceeds or falls below a predetermined threshold value.

7. The base station according to claim 6, wherein
the time slot pattern determination unit uses the number of terminals connected to own base station as the index of the traffic.

8. The base station according to claim 6, wherein
the time slot pattern determination unit uses the number of connections to a higher-level device or the number of connected users as the index of the traffic.

9. The base station according to claim 6, wherein
the time slot pattern determination unit uses a transmission standby buffer size or a free buffer size of own base station as the index of the traffic.

10. A base station in a radio communication system in which a plurality of base stations communicate with a terminal using one or more of a plurality of time slot patterns which have slots divided in time and transmission timing of the slots has a certain interval, the base station comprising:
    an interference measurement unit that measures an uplink interference power in each time slot pattern within at least the interval;
    a time slot pattern determination unit that determines a time slot pattern in which measured uplink interference power is a minimum or smaller than a predetermined threshold value as an uplink time slot pattern to be used in an uplink communication, and a time slot pattern of timing shifted from the determined uplink time slot pattern by a predetermined timing as a downlink time slot pattern to be used in a downlink communication; and
    a communication processing unit that communicates with the terminal using determined uplink and downlink time slot patterns,
    wherein both of a downlink control channel and a data channel are intensively assigned to the determined downlink time slot pattern, and a reference signal and a signal including broadcast information are transmitted in the time slot patterns other than the determined downlink time slot pattern.

11. The base station according to claim 10, wherein
the time slot pattern determination unit assigns the uplink and downlink time slot patterns when detecting that the uplink interference power regularly or irregularly measured by the interference measurement unit exceeds or falls below a predetermined threshold value.

12. The base station according to claim 10, wherein
the time slot pattern determination unit assigns the uplink and downlink time slot patterns when detecting that a downlink communication quality changes by a given amount or more according to downlink communication quality information reported from the terminal.

13. The base station according to claim 12, wherein
the time slot pattern determination unit detects that the downlink communication quality changes by the given amount or more according to a statistical value of an index indicative of a downlink channel quality reported from the terminal.

14. The base station according to claim 12, wherein
the time slot pattern determination unit detects that the downlink communication quality changes by the given amount or more according to an occurrence frequency of an ACK signal from the terminal or a control result of an outer loop control based on the occurrence frequency of the ACK signal.

15. A base station in a radio communication system in which a plurality of base stations communicate with a terminal using one or more of a plurality of time slot patterns which have slots divided in time and transmission timing of the slots has a certain interval, the base station comprising:
an interference measurement unit that measures an uplink interference power in each time slot pattern within at least the interval;
a time slot pattern determination unit that determines a time slot pattern in which measured uplink interference power is a minimum or smaller than a predetermined threshold value as an uplink time slot pattern to be used in an uplink communication, and a time slot pattern of timing shifted from the determined uplink time slot pattern by a predetermined timing as a downlink time slot pattern to be used in a downlink communication; and
a communication processing unit that communicates with the terminal using determined uplink and downlink time slot patterns,
wherein the time slot pattern determination unit determines the downlink time slot pattern to be used in the downlink communication according to an amount of shift set so that the terminal transmits a response to the downlink communication in the determined uplink time slot pattern.

16. The base station according to claim 15, wherein
the time slot pattern determination unit assigns the uplink and downlink time slot patterns when detecting that the uplink interference power regularly or irregularly measured by the interference measurement unit exceeds or falls below a predetermined threshold value.

17. The base station according to claim 15, wherein
the time slot pattern determination unit assigns the uplink and downlink time slot patterns when detecting that a downlink communication quality changes by a given amount or more according to downlink communication quality information reported from the terminal.

18. The base station according to claim 17, wherein
the time slot pattern determination unit detects that the downlink communication quality changes by the given amount or more according to a statistical value of an index indicative of a downlink channel quality reported from the terminal.

19. The base station according to claim 17, wherein
the time slot pattern determination unit detects that the downlink communication quality changes by the given amount or more according to an occurrence frequency of an ACK signal from the terminal or a control result of an outer loop control based on the occurrence frequency of the ACK signal.

* * * * *